United States Patent
Atmur

(10) Patent No.: US 9,484,828 B2
(45) Date of Patent: Nov. 1, 2016

(54) POWER FREQUENCY CONVERTER AND ASSOCIATED METHOD

(71) Applicant: The Boeing Company, Chicago, IL (US)

(72) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 309 days.

(21) Appl. No.: 14/195,152

(22) Filed: Mar. 3, 2014

(65) Prior Publication Data

US 2015/0249399 A1    Sep. 3, 2015

(51) Int. Cl.
  H02P 23/00    (2016.01)
  H02M 5/27    (2006.01)
  H02M 5/257    (2006.01)
  H02P 27/18    (2006.01)
  H02P 7/00    (2016.01)
  H02M 5/293    (2006.01)

(52) U.S. Cl.
  CPC ........... H02M 5/271 (2013.01); H02M 5/2573 (2013.01); H02P 23/00 (2013.01); H02P 27/18 (2013.01); *H02M 2005/2937* (2013.01); *H02P 2007/632* (2013.01)

(58) Field of Classification Search
  CPC .................................................. H02M 5/271
  USPC ........................................ 318/807, 767, 727
  See application file for complete search history.

(56) References Cited

U.S. PATENT DOCUMENTS

| | | |
|---|---|---|
| 3,287,622 A | 11/1966 | Eckenfelder et al. |
| 3,641,418 A | 2/1972 | Plette |
| 3,916,284 A | 10/1975 | Hilgendorf |
| 6,331,759 B1 | 12/2001 | Atmur |
| 6,424,798 B1 * | 7/2002 | Kitamine ............ B60L 11/1807 318/139 |
| 6,466,468 B1 * | 10/2002 | York ................... H02M 1/4208 363/65 |
| 6,642,683 B1 * | 11/2003 | Atmur ....................... H02J 3/40 318/400.09 |
| 6,661,190 B1 | 12/2003 | Atmur |
| 6,693,407 B2 | 2/2004 | Atmur |
| 6,727,673 B2 | 4/2004 | Atmur |
| 6,906,481 B1 | 6/2005 | Atmur |
| 6,927,965 B2 | 8/2005 | Atmur |
| 7,348,755 B2 | 3/2008 | Atmur |
| 7,471,055 B2 | 12/2008 | Atmur |
| 8,577,585 B2 | 11/2013 | Atmur et al. |
| 2014/0183981 A1 | 7/2014 | Atmur |
| 2014/0285072 A1 | 9/2014 | Atmur et al. |
| 2015/0015174 A1 | 1/2015 | Atmur |

OTHER PUBLICATIONS

Extended European Search Report from European Patent Application No. 14200099.1 dated Jul. 27, 2015.

* cited by examiner

*Primary Examiner* — David S Luo

(74) *Attorney, Agent, or Firm* — Alston & Bird LLP

(57) ABSTRACT

A power frequency converter and an associated method are provided to convert an AC input signal at a first frequency, such as a first frequency that is permitted to vary within a range, to an AC output signal at a second frequency that is different than the first frequency and that may be fixed. The power frequency converter includes a plurality of power rectification modules. Each power rectification module includes a plurality of power rectification components for receiving different phases of an input signal at a first frequency. Each power rectification module is configured to provide an output signal to a load, such as an induction motor, at a second frequency. The power frequency converter also includes a controller configured to provide control signals to selectively enable the power rectification modules. The controller is configured to provide the control signals without synchronization to the first frequency.

17 Claims, 4 Drawing Sheets

POWER FREQUENCY CONVERTER AND ASSOCIATED METHOD

TECHNOLOGICAL FIELD

An example embodiment of the present disclosure relates generally to a power frequency converter and an associated method, such as for converting a three phase input signal having a frequency that is permitted to vary to a three phase output signal have a fixed frequency.

BACKGROUND

Hydraulic actuators are utilized for a wide variety of purposes. In order to operate a hydraulic actuator, a hydraulic system including a hydraulic pump, tubing and additional controls is generally required. For example, aircraft utilize hydraulic actuators to perform various functions. By way of an example, some aircraft may include a thrust reverser that must be alternately moved back and forth. In this example scenario, aircraft may include a hydraulic actuator in order to controllably move the thrust reverser.

While hydraulic actuators are useful in many circumstances, some hydraulic actuators may become undesirably expensive in terms of the cost of the hydraulic system, in terms of the space and/or weight of the hydraulic system and/or in terms of the maintenance required to insure that the hydraulic actuator is operational. For example, the hydraulic actuator associated with a thrust reverser must generally be capable of being activated quickly, such as in order to rapidly move the thrust reverser at the end of an aborted take-off. In order to be able to be activated quickly, however, the resulting hydraulic actuator system may become undesirably expensive in terms of cost, space, weight or the like.

As such, induction motors may be utilized instead of hydraulic actuators in some circumstances in order to reduce the cost, space requirements, weight requirements, maintenance demands or the like. An induction motor generally requires three-phase alternating current (AC) power at a fixed frequency. However, the three-phase AC power that is provided by aircraft power systems may not necessarily be at a fixed frequency and, in any event, may not be at the fixed frequency that an induction motor utilizes for most efficient operation. Instead, aircraft power systems may provide three-phase power having a frequency that may vary across a range, such as between 320 Hz and 800 Hz, albeit at a relatively constant or regulated voltage.

In order to fix the frequency of the three-phase power, a frequency converter may receive the variable frequency AC input signal and may generate a fixed frequency AC output signal. The frequency converter may include a plurality of large capacitors and a number, e.g., six, of rectifying diodes and transistors to generate the output power at a fixed frequency. Such frequency converters may have a high cost and may weigh more than is desired. Moreover, the switching frequencies of such frequency converters may be undesirably high. In addition, such frequency converters may be undesirably sensitive to electromagnetic interference (EMI) and lightning or may require a particular physical layout and cabling to address EMI sensitivity.

BRIEF SUMMARY

A power frequency converter and an associated method are provided in accordance with an example embodiment in order to convert an AC input signal at a first frequency to an AC output signal at a second frequency, different than the first frequency. In one embodiment, the first frequency of the AC input signal may be permitted to vary, while the second frequency of the AC output signal may be a fixed frequency such that a fixed frequency may be provided to a load, such as an induction motor. A power frequency converter and associated method of an example embodiment may have a relatively small size and lightweight and may be robust to EMI and lightning, thereby facilitating use of the power frequency converter and associated method onboard aircraft, such as in conjunction with an induction motor for operating a thrust reverser or the like.

In one embodiment, a power frequency converter is provided that includes a plurality of power rectification modules. Each power rectification module includes a plurality of power rectification components for receiving different phases of an alternating current (AC) input signal at a first frequency. Each power rectification module is configured to provide a respective phase of an AC output signal to a load, such as an induction motor, at a second frequency, different than the first frequency. The power frequency converter also includes a controller configured to provide control signals to selectively enable the plurality of power rectification modules. The controller is configured to provide the control signals without synchronization to the first frequency.

The first frequency may be permitted to vary, while the second frequency may be fixed. The power rectification components of one embodiment may be configured to alternately provide positive rectification or negative rectification depending upon the control signal. For example, each power rectification module may include a plurality of thyristors. The controller of one embodiment may be configured to provide a control signal to a respective power rectification component having positive and negative portions and a transition portion between a positive portion and a negative portion. In this embodiment, the transition portion may have a length that is greater than a period of the AC input signal.

The AC input signal may include a three-phase input signal and the AC output signal may include a three-phase output signal. In this embodiment, each power rectification module may include three power rectification components. Each power rectification component of a respective power rectification module may be associated with a different phase of the three-phase input signal. In addition, the output of each power rectification component of a respective power rectification module may be combined for the respective phase of the three-phase output signal.

In another embodiment, an assembly is provided that includes an induction motor and a plurality of power rectification modules. Each power rectification module includes a plurality of power rectification components for receiving different phases of a three-phase alternating current (AC) input signal at a first frequency. Each power rectification module is also configured to provide a respective phase of a three-phase AC output signal to the induction motor at a second frequency, different than the first frequency. In one embodiment, the first frequency may be permitted to vary, while the second frequency is fixed. The assembly of this embodiment may also include a controller configured to provide control signals to selectively enable the plurality of power rectification modules. The controller may be configured to provide the control signals without synchronization to the first frequency.

The power rectification components of an example embodiment may be configured to alternately provide positive rectification or negative rectification depending upon the control signal. Each power rectification module may include three power rectification components. In this embodiment, each power rectification component of a respective power rectification module may be associated with a different phase of the three-phase input signal. Additionally, the output of each power rectification component of a respective power rectification module may be combined for the respective phase of the three-phase output signal. The controller of an example embodiment may be configured to provide a control signal to a respective power rectification component having positive and negative portions and a transition portion between a positive portion and a negative portion. The transition portion may have a length that is greater than the period of the AC input signal.

In a further embodiment, a method of providing power frequency conversion may be provided. In this embodiment, the method may include receiving an alternating current (AC) input signal at a first frequency with each of a plurality of power rectification modules. Each power rectification module may include a plurality of power rectification components for receiving different phases of the AC input signal. The method of this embodiment may also include providing a respective phase of an AC output signal at a second frequency from each power rectification module to a load. The second frequency may be different than the first frequency. In one embodiment, the first frequency is permitted to vary, while the second frequency is fixed. The method of providing power frequency conversion in accordance with this embodiment also includes selectively enabling the plurality of power rectification modules with control signals that are not synchronized to the first frequency.

The method of one embodiment provides the AC output signals by alternately providing positive rectification or negative rectification with the power rectification components depending upon the control signals. The AC input signal of one embodiment may include a three-phase input signal and the AC output signal may correspondingly include a three-phase output signal. Each power rectification module may include, in one embodiment, three power rectification components. In this embodiment, the method may receive the AC input signal by receiving a different phase of the three-phase input signal with each power rectification component of a respective power rectification module. The method of this embodiment may also provide the AC output signal by combining an output of each power rectification component of a respective power rectification module for the respective phase of the three-phase output signal. The method of an example embodiment may selectively enable the plurality of power rectification modules by providing a control signal to a respective power rectification component having positive and negative portions and a transition portion between the positive portion and a negative portion. In this embodiment, the transition portion may have a length that is greater than the period of the AC input signal.

BRIEF DESCRIPTION OF THE DRAWINGS

Figure 1:
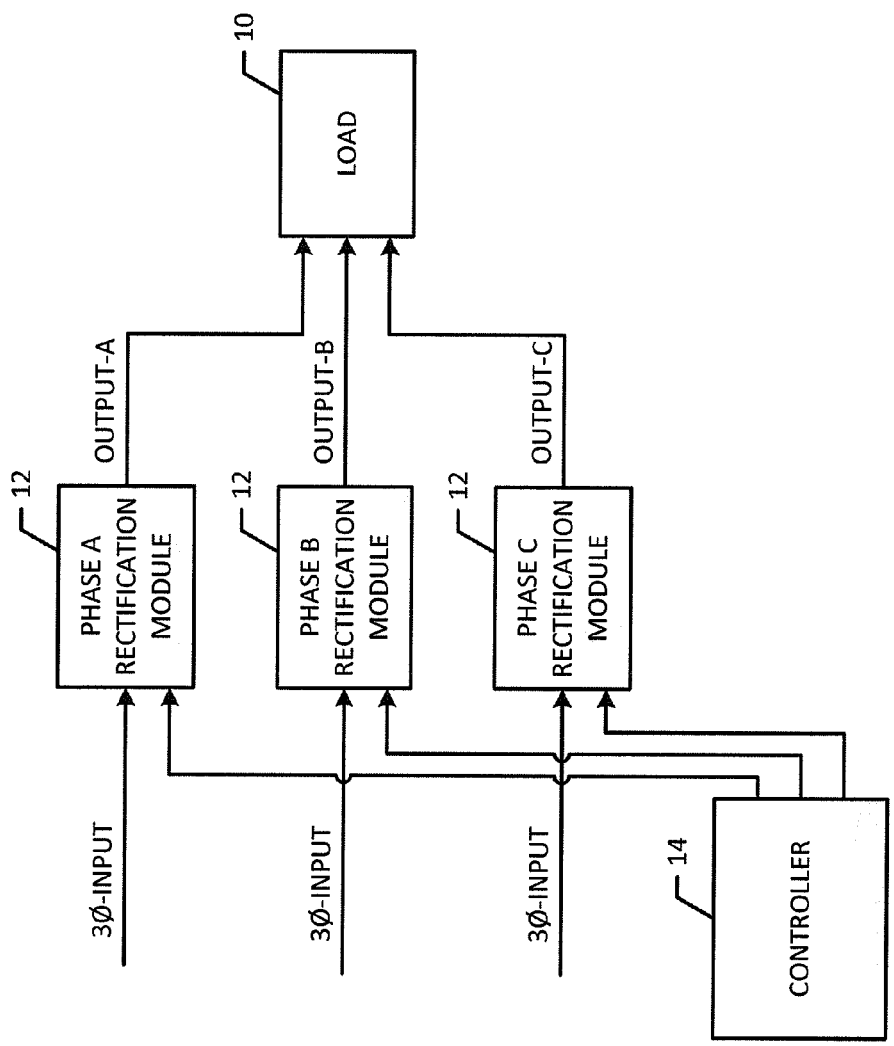
Figure 2:
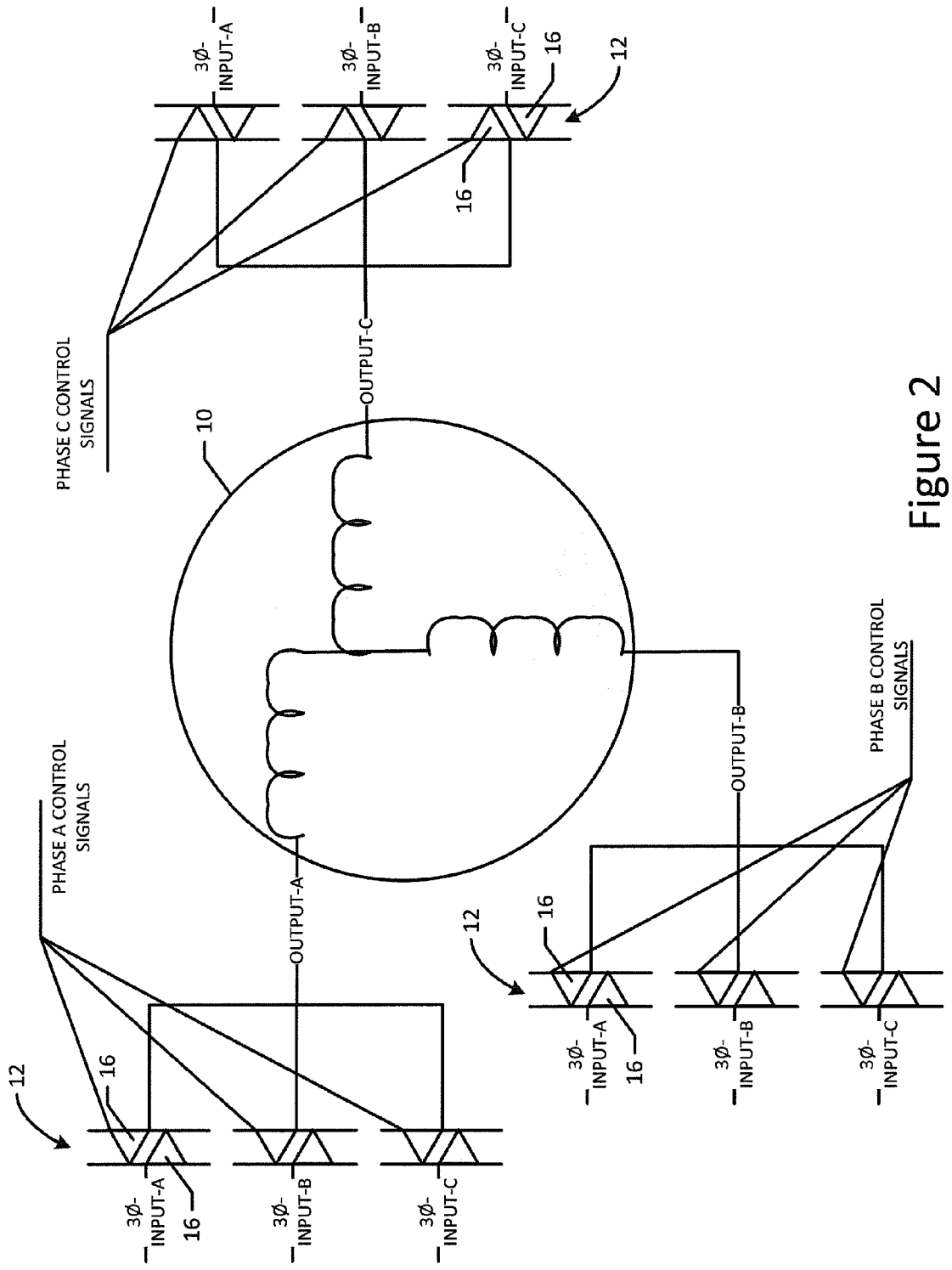
Figure 3:
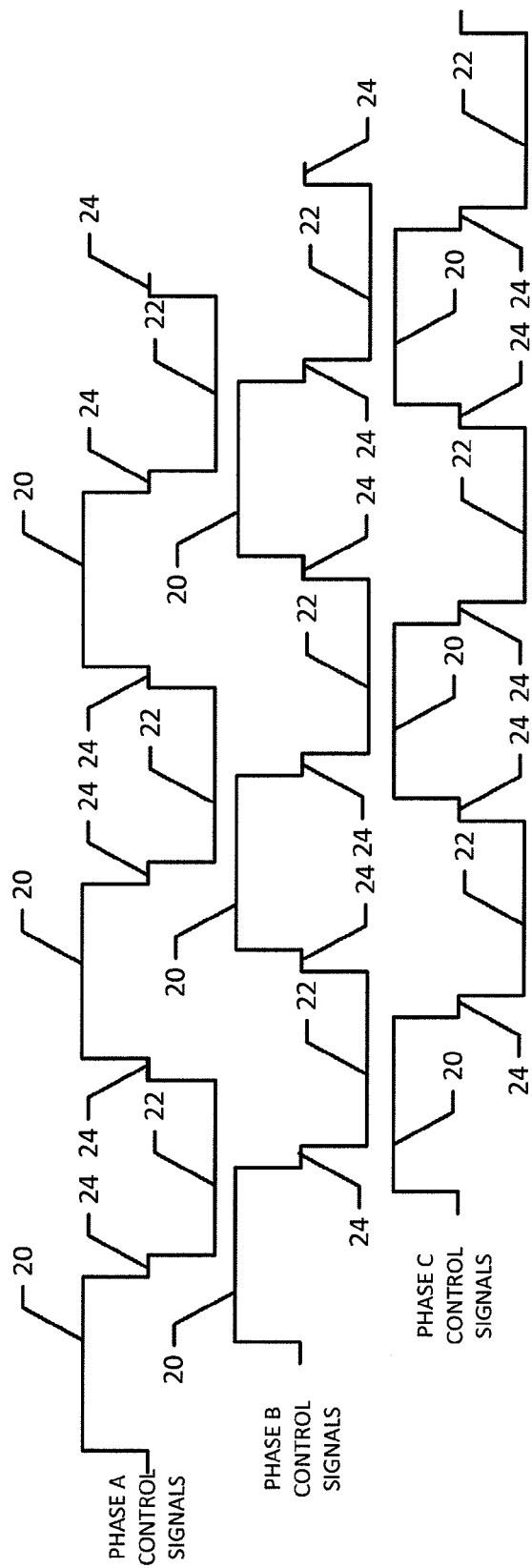
Figure 4:
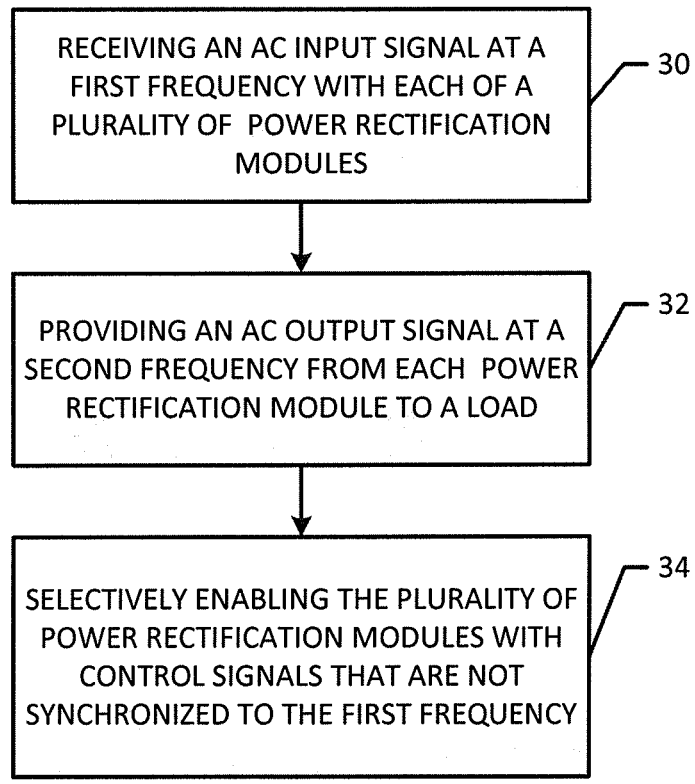

Having thus described aspects of the present disclosure in general terms, reference will now be made to the accompanying drawings, which are not necessarily drawn to scale, and wherein:

FIG. 1 is a block diagram of an assembly including a power frequency converter in accordance with an example embodiment of the present disclosure;

FIG. 2 is a more detailed representation of an assembly including a power frequency converter in accordance with an example embodiment of the present disclosure;

FIG. 3 is a graphical representation of the control signals provided to the power rectification components in accordance with an example embodiment of the present disclosure; and FIG. 4 is a flowchart illustrating operations performed in accordance with a method of providing power frequency conversion in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

Referring now to FIG. 1, an assembly including a power frequency converter for providing power, such as at a predefined fixed frequency, to a load 10 is illustrated. The power frequency converter and the associated method may be utilized in a wide variety of applications and, as a result, in conjunction with various loads. By way of example but without limitation, the power frequency converter will be described hereinafter in conjunction with the provision of three-phase power at a predefined frequency to a load onboard an aircraft. For example, the load onboard an aircraft may be an induction motor that may serve various functions. In this regard, the induction motor may be operably connected to a thrust reverser so as to controllably and quickly move the thrust reverser to a commanded position.

As shown in FIG. 1, the power frequency converter may receive an alternating current input signal, such as a three-phase AC input signal, 3Ø-INPUT. The three-phase AC input signal, 3Ø-INPUT, includes three phase components, 3Ø-INPUT-A, 3Ø-INPUT-B and 3Ø-INPUT-C. Each phase component is offset from the other phase components by about 120-degrees (120°, 2π/3 radians) or about one-third of the period of the input waveform. In one embodiment, the three-phase input signal is provided at a first frequency that is permitted to vary. In the context of an aircraft, aircraft power may be provided at a frequency that may vary within a range, such as between 320 Hz and 800 Hz. However, at least some loads 10, such as an induction motor, operate most efficiently and effectively at a predefined fixed frequency. The fixed frequency of the AC output signal may be greater or less than the first frequency of the AC input signal, but, in one embodiment, is 40 Hz. In one embodiment, for example, the frequency of the AC output signal may be within a range of 0.003 Hz to 400 Hz as limited by the input frequency range. As such, the power frequency converter of an example embodiment may convert the three-phase AC input signal at a first frequency that is permitted to vary to a three-phase AC output signal at a second, fixed frequency at which the load may operate in an efficient manner.

The three-phase AC input signal may be provided at a constant or regulated voltage. As a result of the rectification provided by the power frequency converter of an example embodiment, the resulting phases of the AC output signal provided to the load 10 may be noisier than the three-phase AC input signal. As described below, for example, the three-phase AC input signal may be a square waveform with ripple superimposed upon the positive and negative portions of the square waveform as a result of the rectification. However, many types of loads, such as an induction motor, are configured to receive and operate based upon such a noisy signal, such as a signal having ripple superimposed upon the positive and negative portions of a square waveform, so long as the frequency is fixed as provided by the power frequency converter of an example embodiment of the present disclosure.

As also shown in FIG. 1, the power frequency converter includes a plurality of power rectification modules. Each power rectification module includes a plurality of power rectification components for receiving a plurality of different phases of the AC input signal at the first frequency, such as the three phases of the AC input signal. Each power rectification module is configured to provide a respective phase of an AC output signal, such as a single-phase AC output signal, to the load 10 at a second frequency, different than the first frequency. Collectively, the single-phase AC output signals provided by the respective power rectification modules may comprise a three-phase AC output signal provided to the load at the second frequency. In an embodiment in which the AC input signal is a three-phase AC input signal and a three-phase AC output signal is provided to the load, each power rectification module may receive all three phases of the AC input signal with each phase of the AC input signal being directed to a different power rectification component of a respective power rectification module as described in more detail below. In addition, the output of each power rectification component of a respective power rectification module may be combined to generate a respective phase of the three-phase AC output signal. With reference to FIG. 1, for example, the first power rectification module designated the PHASE A POWER RECTIFICATION MODULE may include a plurality of power rectification components having outputs that are combined to generate one phase, e.g., Phase A designated OUTPUT-A, of the three-phase AC output signal that is provided to the load. Similarly, the second and third power rectification modules designated the PHASE B and PHASE C POWER RECTIFICATION MODULES may provide Phase B and Phase C designated OUTPUT-B and OUTPUT-C, respectively, of the three-phase AC output signal provided to the load in this embodiment.

Referring now to FIG. 2, a load 10 in the form of an induction motor is depicted to receive Phase A, Phase B and Phase C designated OUTPUT-A, OUTPUT-B and OUTPUT-C, respectively, of a three-phase AC output signal from the different power rectification modules 12. As shown in FIG. 2, each power rectification module of an example embodiment in which the AC input and output signals are three-phase may include three power rectification components with each power rectification component of a respective module associated with a different phase of the three-phase AC input signal, such as by being configured to receive a different phase of the three-phase AC input signal. For example, a first power rectification component may receive Phase A of the three-phase AC input signal designated 3Ø-INPUT-A, while a second power rectification component receives Phase B of the three-phase AC input signal designated 3Ø-INPUT-B and a third power rectification component receives Phase C of the three-phase AC input signal designated 3Ø-INPUT-C. Moreover, the embodiment of FIG. 2 depicts the outputs of the three power rectification components of a respective module being combined to form a respective phase, e.g., OUTPUT-A, OUTPUT-B or OUTPUT-C, of the three-phase AC output signal that is provided to the induction motor.

In the illustrated embodiment, each power rectification component is a thyristor 16, such as a silicon controlled rectifier (SCR). Each thyristor receives an input signal, such as a respective phase of the three-phase AC input signal, and then positively rectifies or negatively rectifies the input signal based upon a control signal so as to generate an output.

A power frequency converter may therefore include a controller 14, such as shown in FIG. 1, in order to provide control signals to the power rectification components. The control signals selectively enable the plurality of power rectification modules 12 such that the load 10, such as an induction motor, is provided with a three-phase AC output signal at a second frequency, different than the first frequency of the AC input signal. In this regard, the second frequency may be a fixed frequency even though the first frequency was permitted to vary. By providing power at a fixed frequency to the load, the load, such as an induction motor, may operate more efficiently. The controller may be embodied in various manners, such as by a processor, a computing device, such as a computer, e.g., a computer onboard an aircraft, or the like.

Although the controller 14 may be configured to provide various control signals to the power rectification components, the controller of one embodiment is configured to provide different control signals to each power rectification module 12. For a respective power rectification module, however, the controller may be configured to provide the same control signals to each power rectification component of the respective module. As shown in FIG. 2, for example, the controller may provide the same PHASE A CONTROL SIGNALS to each of the three power rectification components of the first power rectification module. The controller may also provide the same PHASE B CONTROL SIGNALS to each of the three power rectification components of the second power rectification module with the PHASE B CONTROL SIGNALS being different than the PHASE A CONTROL SIGNALS. Further, the controller of this embodiment may be configured to provide the same PHASE C CONTROL SIGNALS to each of the three power rectification components of the third power rectification module with the PHASE C CONTROL SIGNALS being different than both the PHASE A CONTROL SIGNALS and the PHASE B CONTROL SIGNALS.

In one embodiment, the controller 14 may be configured to provide control signals of the type shown in FIG. 3. In this regard, FIG. 3 separately depicts the PHASE A CONTROL SIGNALS, the PHASE B CONTROL SIGNALS and the PHASE C CONTROL SIGNALS. As shown, each of the control signals is cyclic and includes a positive portion 20 followed by a negative portion 22 and then another positive portion and so on in a repeating manner. In addition, the control signal may include a transition portion 24 between each positive portion and each adjacent negative portion. During the transition portion, the control signal is off, e.g., has a value of 0, so as to separate the positive and negative portions and to prevent input phase to phase conduction. Indeed, in the absence of a transition portion, two phases of the input could be connected such that a phase to phase short could occur. As shown in FIG. 3, the PHASE A CONTROL SIGNALS, the PHASE B CONTROL SIGNALS and the PHASE C CONTROL SIGNALS may differ from one another, but only in terms of timing in one embodiment with the frequency and the waveform otherwise being identical, albeit time shifted relative to one another, such as by about 120° or about one-third of the period of the waveform. The frequency of the control signals provided by the controller may be the same or very similar to the second frequency with which the AC output signals are generated. However, the frequency of the control signal need not be synchronized with the first frequency of the AC input signal, thereby simplifying the design of the power frequency converter. In terms of the waveform, as shown in FIG. 3, the positive portions and negative portions may have lengths that are the same or approximately equal, while the length of the transition portion may be much shorter. However, the transition portion of an example embodiment has a length that is greater than the period of the AC input signal to prevent input phase to phase conduction.

In response to the control signals, the power rectification components may be configured to alternately provide positive rectification of the input signal or negative rectification of the input signal. In an example embodiment, the positive portion 20 of the control signal may cause the power rectification components to which the control signal is provided to provide positive rectification of the input signal, while the negative portion 22 of the same control signal may cause the same power rectification components to negatively rectify the control signal. As such, the output of a respective power rectification component may have a square waveform that approximates or mirrors the square waveform of the control signal provided thereto. The output of each power rectification component of a respective set 12 may be combined to provide a respective phase of the output signals provided to the load 10. The output signals will therefore also generally have a square waveform at a second fixed frequency, different than the first frequency of the AC input signals. As a result of the rectification, however, the output signals may be noisier than the input signals, such as by including ripple on the positive and negative portions of the square waveform. However, at least some loads 10, such as an induction motor, may operate efficiently and effectively in response to a noisier waveform, particularly in an instance in which the waveform is at a predefined, fixed frequency.

With reference now to FIG. 4, a method of providing power frequency conversion is depicted. As shown in block 30, the method includes receiving an AC input signal at a first frequency with each of a plurality of power rectification modules 12. In one embodiment, the first frequency is permitted to vary. As described above, each power rectification module may include a plurality of power rectification components for receiving different phases of the AC input signal. In an embodiment in which the AC input signal is a three-phase AC input signal and in which each power rectification module correspondingly includes three power rectification components, the method may receive the AC input signal by receiving a different phase of the three-phase AC input signal with each power rectification component of a respective power rectification module.

The method of this embodiment may also include providing an AC output signal at a second frequency from the power rectification modules to a load 10, such as an induction motor. See block 32 of FIG. 4. The second frequency is different than the first frequency and, in one embodiment, is a fixed frequency. In an embodiment in which the AC output signal is a three-phase AC output signal, the method may provide the AC output signal by combining an output of each power rectification component of a respective power rectification module 12 to form the respective phase of the three-phase AC output signal. The method of this embodiment also includes selectively enabling the plurality of power rectification modules with control signals that are not synchronized to the first frequency. See block 34. In this embodiment, the method may provide the AC output signals by alternately providing positive rectification or negative rectification with the power rectification components depending upon the control signals. For example, the method may enable the plurality of power rectification modules by providing a control signal to a respective power rectification component having positive and negative portions 20, 22 and a transition portion 24 between a positive portion and a negative portion. In this embodiment, the transition portion may have a length that is greater than a period of the AC input signal.

The power frequency converter and the associated method of an example embodiment may therefore convert an input signal having a variable frequency and a constant or regulated voltage, such as 235 V, to an output signal having a different frequency, such as a fixed frequency, and, in one embodiment, a noisier waveform that may be provided to a load 10, such as an induction motor, to permit the induction motor to operate more efficiently. In the embodiment illustrated in FIG. 2, the power frequency converter may utilize only 9 power rectification components, such as nine thyristors 16, with no capacitors such that the power frequency converter may be less expensive, may consume less space and may weigh less than other designs. Further, the power frequency converter of an example embodiment may be more robust to electromagnetic interference and lightning, thereby facilitating utilization in a broader range of applications including onboard an aircraft, such as to operate an induction motor that may, for example, actuate a thrust reverser. In this regard, an induction motor, such as a 35 horsepower induction motor, may run for a first period of time, such as about 1.5 seconds, to activate a thrust reverser and may run for a second period of time, such as about 2.5 seconds, to return the thrust reverse to a stowed position The power frequency converter and the associated method may be employed in other applications that utilize a variable frequency AC source. The power frequency converter and the associated method may also be employed in conjunction with a motor having desirable performance characteristics that will otherwise be driven by an AC source having an incorrect or undesirably variable frequency.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A power frequency converter comprising:
   a plurality of power rectification modules, each power rectification module comprising a plurality of power rectification components for receiving different phases of an alternating current (AC) input signal at a first frequency; each power rectification module configured to provide a respective phase of an AC output signal to a load at a second frequency, different than the first frequency; and
   a controller configured to provide control signals to selectively enable the plurality of power rectification modules, wherein the controller is configured to provide the control signals without synchronization to the first frequency,
   wherein the power rectification components are configured to alternately provide positive rectification or negative rectification depending upon the control signal.

2. The power frequency converter of claim 1 wherein the first frequency is permitted to vary, and wherein the second frequency is fixed.

3. The power frequency converter of claim 1 wherein each power rectification module comprises a plurality of thyristors.

4. The power frequency converter of claim 1 wherein the AC input signal comprises a three phase input signal, and wherein the AC output signal comprises a three phase output signal.

5. A power frequency converter comprising:
a plurality of power rectification modules, each power rectification module comprising a plurality of power rectification components for receiving different phases of an alternating current (AC) input signal at a first frequency; each power rectification module configured to provide a respective phase of an AC output signal to a load at a second frequency, different than the first frequency, wherein the AC input signal comprises a three phase input signal and the AC output signal comprises a three phase output signal, wherein each power rectification module comprises three power rectification components with each power rectification component of a respective power rectification module associated with a different phase of the three phase input signal and with an output of each power rectification component of a respective power rectification module being combined for the respective phase of the three phase output signal; and
a controller configured to provide control signals to selectively enable the plurality of power rectification modules, wherein the controller is configured to provide the control signals without synchronization to the first frequency.

6. A power frequency converter comprising:
a plurality of power rectification modules, each power rectification module comprising a plurality of power rectification components for receiving different phases of an alternating current (AC) input signal at a first frequency; each power rectification module configured to provide a respective phase of an AC output signal to a load at a second frequency, different than the first frequency; and
a controller configured to provide control signals to selectively enable the plurality of power rectification modules, wherein the controller is configured to provide the control signals without synchronization to the first frequency, wherein the controller is configured to provide a control signal to a respective power rectification component having positive and negative portions and a transition portion between a positive portion and a negative portion.

7. The power frequency converter of claim 6 wherein the transition portion has a length that is greater than a period of the AC input signal.

8. An assembly comprising:
an induction motor;
a plurality of power rectification modules, each power rectification module comprising a plurality of power rectification components for receiving different phases of a three phase alternating current (AC) input signal at a first frequency; each power rectification module configured to provide a respective phase of a three phase AC output signal to the induction motor at a second frequency, different than the first frequency; and
a controller configured to provide control signals to selectively enable the plurality of power rectification modules, wherein the controller is configured to provide the control signals without synchronization to the first frequency,
wherein the power rectification components are configured to alternately provide positive rectification or negative rectification depending upon the control signal.

9. The assembly of claim 8 wherein the first frequency is permitted to vary, and wherein the second frequency is fixed.

10. The assembly of claim 8 wherein each power rectification module comprises three power rectification components with each power rectification component of a respective power rectification module associated with a different phase of the three phase input signal and with an output of each power rectification component of a respective power rectification module being combined for the respective phase of the three phase output signal.

11. The assembly of claim 8 wherein the controller is configured to provide a control signal to a respective power rectification component having positive and negative portions and a transition portion between a positive portion and a negative portion.

12. The assembly of claim 11 wherein the transition portion has a length that is greater than a period of the AC input signal.

13. A method of providing power frequency conversion, the method comprising:
receiving an alternating current (AC) input signal at a first frequency with each of a plurality of power rectification modules, each power rectification module comprising a plurality of power rectification components for receiving different phases of the AC input signal;
providing a respective phase of an AC output signal at a second frequency from each power rectification module to a load, wherein the second frequency is different than the first frequency, wherein providing the AC output signals comprises alternately providing positive rectification or negative rectification with the power rectification components depending upon the control signal; and
selectively enabling the plurality of power rectification modules with control signals that are not synchronized to the first frequency.

14. The method of claim 13 wherein the first frequency is permitted to vary, and wherein the second frequency is fixed.

15. The method of claim 13 wherein the AC input signal comprises a three phase input signal, and wherein the AC output signal comprises a three phase output signal.

16. The method of claim 15 wherein each power rectification module comprises three power rectification components, wherein receiving the AC input signal comprises receiving a different phase of the three phase input signal with each power rectification component of a respective power rectification module, and wherein providing the AC output signal comprises combining an output of each power rectification component of a respective power rectification module for the respective phase of the three phase output signal.

17. The method of claim 13 wherein selectively enabling the plurality of power rectification modules comprises providing a control signal to a respective power rectification component having positive and negative portions and a transition portion between a positive portion and a negative portion, wherein the transition portion has a length that is greater than a period of the AC input signal.

* * * * *